United States Patent [19]
Naito

[11] Patent Number: 5,184,520
[45] Date of Patent: Feb. 9, 1993

[54] LOAD SENSOR

[75] Inventor: Kazufumi Naito, Shiga, Japan

[73] Assignee: Ishida Scales Mfg. Co., Ltd., Shiga, Japan

[21] Appl. No.: 595,430

[22] Filed: Oct. 11, 1990

[30] Foreign Application Priority Data

Oct. 18, 1989 [JP] Japan .................. 1-272285

[51] Int. Cl.$^5$ .............................................. G01D 3/04
[52] U.S. Cl. ........................... 73/862.623; 73/862.628
[58] Field of Search ................. 73/708, 727, 765, 766, 73/862.63, 862.67; 330/256, 289

[56] References Cited

U.S. PATENT DOCUMENTS

| | | | |
|---|---|---|---|
| 4,326,171 | 4/1982 | Shaw et al. | 330/289 X |
| 4,329,878 | 5/1982 | Utner et al. | 73/862.63 X |
| 4,432,247 | 2/1984 | Takeno et al. | 73/766 X |
| 4,522,067 | 6/1985 | Burger et al. | 73/862.65 |
| 4,576,052 | 3/1986 | Sugiyama | 73/862.63 |
| 5,042,307 | 8/1991 | Kato | 73/708 |

FOREIGN PATENT DOCUMENTS

| | | |
|---|---|---|
| 0053486 | 6/1982 | European Pat. Off. . |
| 0087665 | 9/1983 | European Pat. Off. . |
| 0164862 | 12/1985 | European Pat. Off. . |
| 0239094 | 9/1987 | European Pat. Off. . |
| 0152913 | 8/1985 | Japan .................. 73/862.63 |

Primary Examiner—Michael T. Razavi
Assistant Examiner—Elizabeth L. Shopbell
Attorney, Agent, or Firm—Heller, Ehrman, White & McAuliffe

[57] ABSTRACT

A load sensor is made of a load-sensitive element made preferably of an aluminum alloy, a bridge circuit with strain gauges made preferably of tantalum nitride and formed on the load-sensitive element, and two operational amplifiers with their non-inversion input terminals connected respectively to the signal output terminals of the bridge circuit and their inversion input terminals connected to each other through a temperature-sensitive resistor having a positive second-order temperature coefficient and a precision resistor. The resistance values of these resistors are adjusted so as to compensate for the first-order and second-order temperature coefficients of the temperature-dependent output from the bridge circuit.

19 Claims, 3 Drawing Sheets

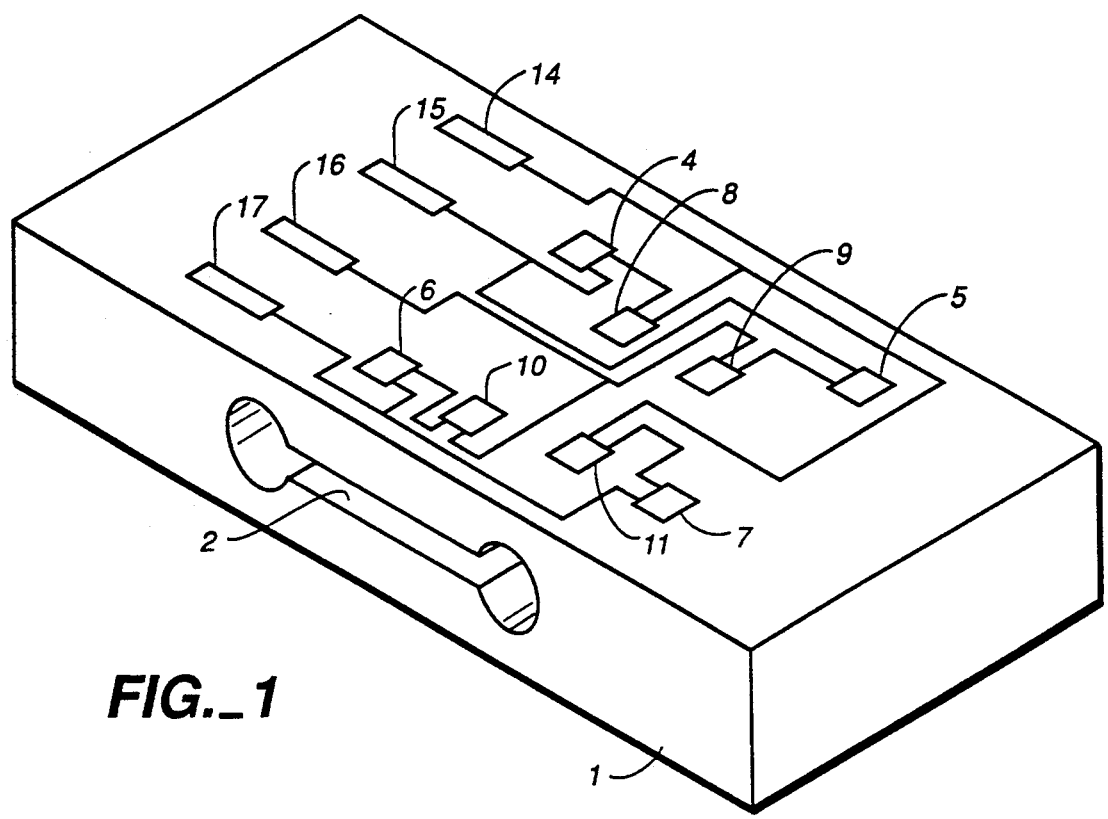
FIG._1
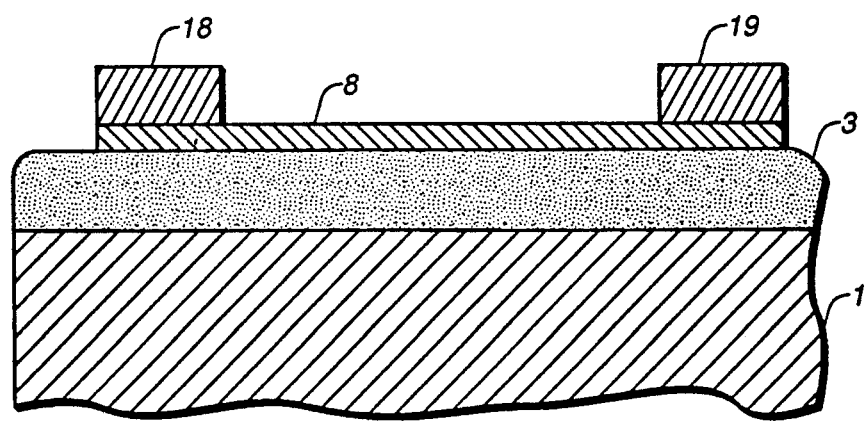
FIG._2

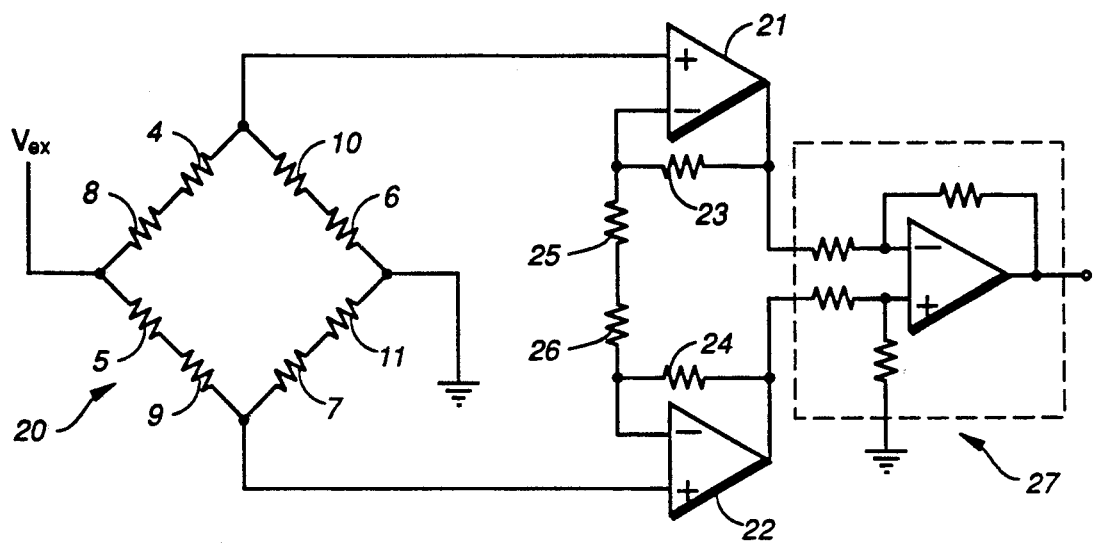
FIG._3
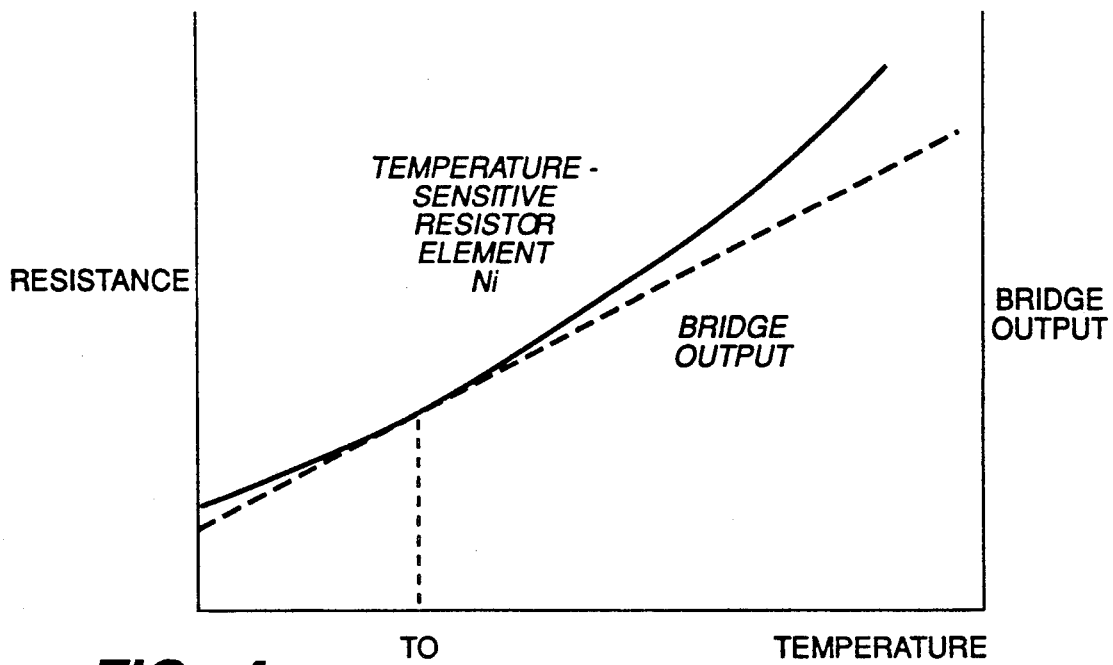
FIG._4

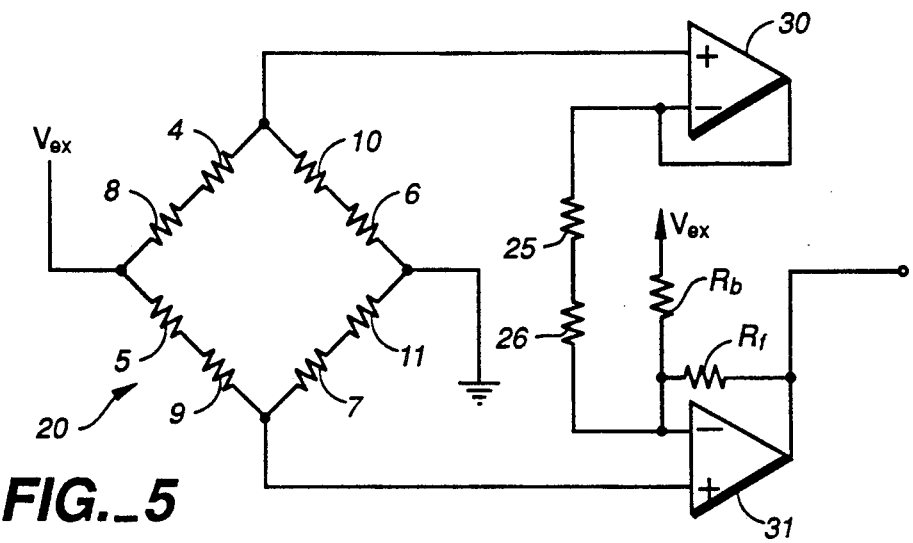
FIG._5
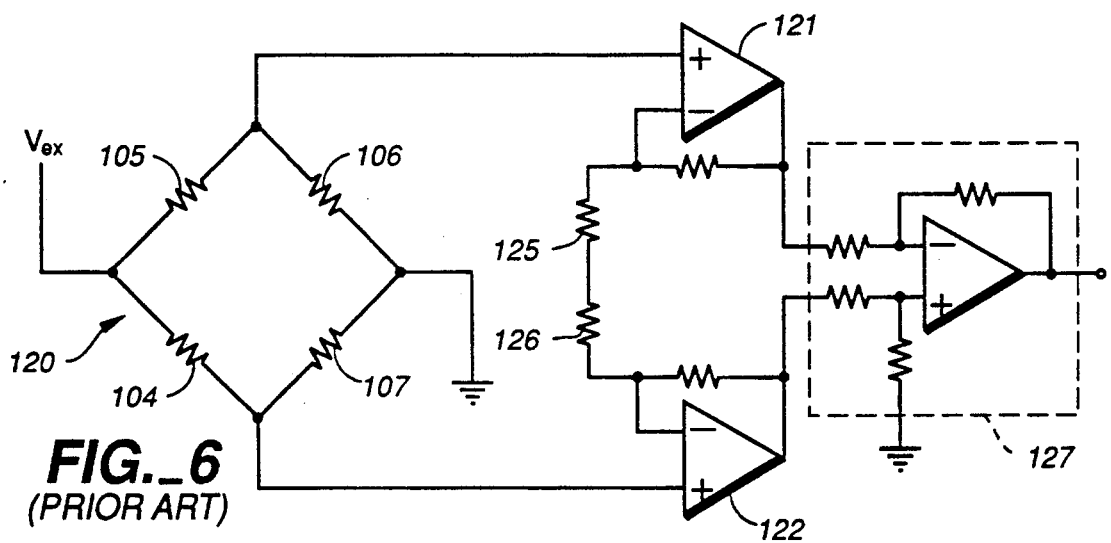
FIG._6
(PRIOR ART)
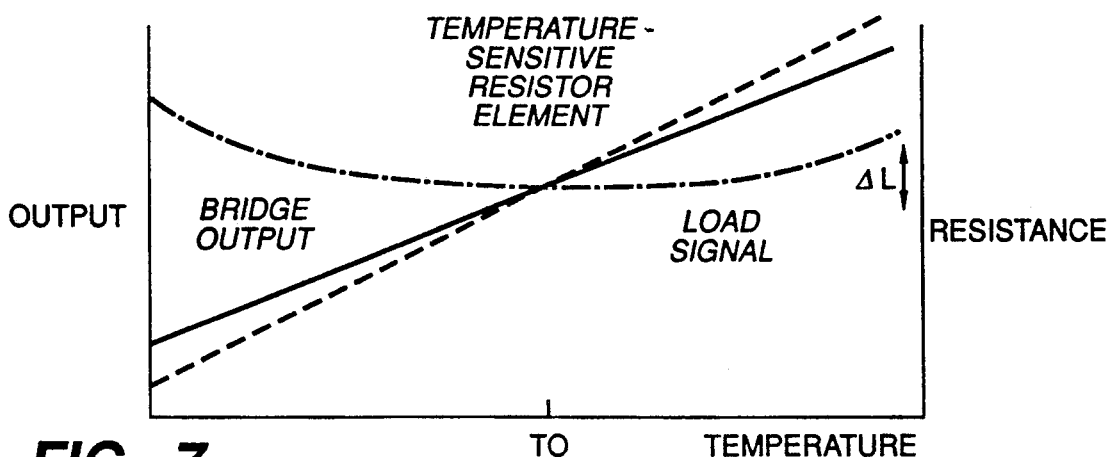
FIG._7
(PRIOR ART)

LOAD SENSOR

BACKGROUND OF THE INVENTION

This invention relates to a load sensor having strain gauges attached to a load-sensitive element and a temperature-sensitive element with which the effects of temperature variations on the output from the strain gauges can be compensated.

A load sensor for converting a force or a weight into an electrical signal is generally formed by attaching a plurality of (generally four) strain gauges to a load-sensitive element made usually of an aluminum alloy, connecting these strain gauges to a bridge circuit, and providing a temperature-sensitive resistor element for detecting the temperature of the load-sensitive element in order to make corrections on the output from the bridge circuit. FIG. 6 shows an example of such a prior art load sensor comprised of a bridge circuit 120, operational amplifiers 121 and 122, and a differential amplifier circuit 127. The bridge circuit 120 is formed by connecting strain gauges 104, 105, 106 and 107 of a copper-nickel alloy foil attached to a load-sensitive element and its signal output terminals are connected to the non-inversion input terminals of the operational amplifiers 121 and 122 of which the inversion terminals are connected to a temperature-sensitive resistor element 125 for detecting the temperature of the load-sensitive element. The differential amplifier circuit 127 is adapted to receive the outputs from the operational amplifiers 121 and 122. Variations in the load signals from such a load sensor due to the temperature characteristic of the Young's modulus of the aluminum material of the load-sensitive element as well as that of the strain gauges are corrected by adjusting the amplification of the amplifier circuit provided with the temperature-sensitive resistor element 125. In FIG. 6, numeral 126 indicates a precision resistor.

A load sensor of this type allows temperature corrections of its load signals with high accuracy but only for temperature variations within a relatively narrow range including a reference temperature for correction $T_0$. As shown in FIG. 7, if the temperature variation from this reference temperature $T_0$ becomes large, the error (indicated by $\Delta L$ in FIG. 7) becomes large suddenly. This is because both the temperature characteristic of the output from the bridge circuit and that of the output from the amplifier circuit including the temperature-sensitive resistor element 125 have positive second-order characteristics, or a positive second-order temperature coefficient. Throughout herein, if the temperature-dependence of a physical quantity (such as an output from a circuit) can be approximately written as a polynomial function of temperature as measured from a certain reference temperature and if the coefficient of the second-order term (or first-order term) of this polynomial function is positive (or negative), this physical quantity will be said to have a positive (or negative) second-order (or first-order) temperature coefficient.

In order to overcome this problem of prior art load sensors as described above, the present inventor has earlier attempted to make use of a combination type temperature-sensitive resistor element with a first temperature-sensitive resistor piece not having a positive temperature coefficient and a second temperature-sensitive resistor piece having a positive temperature coefficient, thereby providing a load sensor with a superior temperature characteristic over a wider range of temperature (Japanese Patent Application Tokugan 1-58753, filed Mar. 9, 1989). In using such a load sensor, however, the operator must set the resistance values while adjusting the resistance ratio between the first and second temperature-sensitive elements. In other words, correction of effects due to temperature variations was extremely cumbersome with prior art devices.

SUMMARY OF THE INVENTION

It is therefore a general object of the present invention to provide a load sensor with improved temperature characteristics.

It is a more specific object of the present invention to provide such a load sensor, the effects of temperature on output from which can be easily corrected.

It is another object of the present invention to provide a load sensor having a temperature-sensitive resistor element of a single kind with which accurate temperature corrections are still possible.

The above and other objects of the present invention can be achieved by providing a load sensor comprising a load-sensitive element made preferably of an aluminum alloy, a bridge circuit with strain gauges made preferably of tantalum nitride and formed on this element, and two operational amplifiers with their non-inversion input terminals connected respectively to the signal output terminals of the bridge circuit and their inversion input terminals connected to each other through a temperature-sensitive resistor element having a positive second-order temperature coefficient and a precision resistor. With a load sensor thus structured, weights can be measured accurately under a wide range of temperature variations by a simple adjustment operation because the temperature characteristic of the bridge output can be matched by adjusting the value of the temperature-sensitive resistor element composed of a single material.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a schematic diagonal view of a load cell embodying the present invention, FIG. 2 is a sectional view of the load cell of FIG. 1, FIG. 3 is a block diagram showing the structure of a load sensor using the load cell shown in FIG. 1, FIG. 4 is a graph showing the temperature characteristics of a temperature-sensitive resistor element used in the load sensor shown in FIG. 3 and the temperature output characteristics of the bridge circuit, FIG. 5 is a block diagram of another load sensor embodying the present invention, FIG. 6 is a block diagram of a prior art load sensor, and FIG. 7 is a graph which schematically shows prior art temperature correction characteristics.

DETAILED DESCRIPTION OF THE INVENTION

With reference to FIGS. 1 and 2, numeral 1 indicates a load-sensitive element made of an aluminum alloy material having a throughhole 2 with the cross-sectional shape of a dumb bell formed near its center such that strain will be easily generated at specified parts thereof. On a surface of the load-sensitive element 1 where a load is intended to be applied, there is formed an electrically insulating layer 3 by a coating of a material with high molecular weight such as polyimide which is heat-resistant and does not lose elasticity at high temperatures of vapor deposition and heat treatments. A thin tantalum nitride ($Ta_2N$) film is formed by vapor deposition at four places on the surface of this insulating layer 3 where it is convenient to detect strain. Gauge resistor patterns are formed from these thin films by photolithography to unistructurally form stain gauges 4, 5, 6 and 7. On the other hand, resistors 8, 9, 10 and 11 for zero-point adjustment are formed where the strain of the load-sensitive element 1 is as small as possible. These resistors and the four strain gauges 4, 5, 6 and 7 are connected by electroconductive patterns 18 and 19 to form a bridge circuit (indicated in FIG. 3 at 20) such that these strain gauges 4, 5, 6 and 7 become its branches. Numerals 14, 15, 16 and 17 indicate bridge terminals.

With the bridge connections thus completed, the resistance values of the zero-point adjustment resistors 8, 9, 10 and 11 are adjusted by a trimming process so as to adjust the zero-point of the bridge circuit as a whole. Next, lead lines (not shown in FIG. 1) are attached to the terminals 14, 15, 16 and 17 and a moisture-proofing material is applied to thereby complete the preparation of a load cell carrying thereon strain gauges and zero-point adjustment resistors connected in the form of a bridge.

FIG. 3 shows an example of load sensor using the load cell shown in FIGS. 1 and 2. Numeral 20 indicates the bridge circuit formed on the load-sensitive element 1. Numerals 21 and 22 indicate operational amplifiers. The non-inversion input terminals of these operational amplifiers 21 and 22 are individually connected to an signal output terminal of the bridge circuit 20. The inversion input terminals and the output terminals of these operational amplifiers 21 and 22 are connected respectively through return resistors 23 and 24 made of a precision resistor material. The inversion input terminals of these two operational amplifiers 21 and 22 are connected together through a temperature-sensitive resistor element 25 and a precision resistor 26.

The temperature-sensitive resistor element 25 is made of nickel or a nickel alloy having temperature-dependent resistance with a positive second-order temperature coefficient and is either affixed to the load-sensitive element 1 or disposed as close thereto as possible so as to be able to measure its temperature. The precision resistor 26 is provided for matching the first-order temperature coefficient as will be discussed more in detail below and is connected in series with the temperature-sensitive resistor element 25. Numeral 27 indicates a differential amplifier circuit which not only receives output signals from the operational amplifiers 21 and 22 but also cooperates therewith to form a high input impedance differential amplifier circuit.

If strain gauges of tantalum nitride are used on a load-sensitive element made of an aluminum alloy, the rate of change in the span coefficient of its output is about 350PPM/° C. This is about ½ of the rate of 650PPM/° C. in the case of a strain gauge made of a copper-nickel alloy. Thus, as shown in FIG. 4, the temperature-resistance characteristic of the temperature-sensitive resistor element 25 made of nickel can be used sufficiently well for temperature compensation.

As a matter of practice, the temperature-output characteristic of the output from the bridge circuit 20 is preliminarily determined by measuring the changes in its output signal at different temperatures. If this temperature-output characteristic can be approximately written in the form of $1+\alpha\Delta T$ where $\Delta T$ is the temperature measured from a predetermined reference temperature $T_0$ at which temperature compensation is effected. The coefficient $\alpha$ thus determined may be referred to as the temperature coefficient.

After the value of the temperature coefficient $\alpha$ for the bridge output is thus determined, the temperature coefficient of the output from the aforementioned high input impedance differential amplifier circuit composed of the operational amplifiers 21 and 22 and the differential amplifier circuit 27 is determined. Thereafter the resistance values of the temperature-sensitive resistor element 25 of nickel or a nickel alloy and the precision resistor 26 are properly matched as follows.

Let the reference temperature be 25° C. and $f_{SP}(T)$ represent the standard output from the bridge circuit 20 at temperature $(25+T)°$ C. Then, $f_{SP}(T)$ may be expressed as $$f_{SP}(T) = f_{SP0}(1 + \alpha_{SP25}T)$$

where the temperature coefficient of the bridge output near 25° C. ($=\alpha_{SP25}$) may be written as a function of T as $$\alpha_{SP25} = \alpha_{1SP} + \alpha_{2SP}T.$$

In other words, $\alpha_{1SP}$ represents the temperature coefficient of the bridge output at 25° C. and $\alpha_{2SP}$ represents the linear dependence on temperature of the temperature coefficient of the bridge output when temperature changes from 25° C.

Amplification $f_a(T)$ of the high input impedance differential amplifier circuit can be expressed as $$f_a(T) = f_{a0}(1 - \alpha_{S25}C_0 T)$$

where $f_{a0}$ and $C_0$ can be expressed as follows as functions of the resistance $R_0$ of the temperature-sensitive resistor element 25, the resistance $R_1$ of the precision resistor 26 and the resistance $R_2$ of the return resistors 23 and 24:

$$f_{a0} = (R_0 + R_1 + 2R_2)/(R_0 + R_1), \text{ and}$$

$$C_0 = 2R_1 R_2 / [(R_0 + R_1 + 2R_2)(R_0 + R_1)]$$

and $\alpha_{S25}$ is the temperature coefficient of the amplification near 25° C. and may be expressed as follows:

$$\alpha_{S25} = \alpha_1 + \alpha_2 T.$$

In other words, $\alpha_1$ represents the temperature coefficient of the amplification at 25° C. and $\alpha_2$ represents the linear dependence on temperature of the temperature coefficient of the amplification near 25° C.

Thus, the total output $f_t(T)$ when the output from the bridge circuit 20 is passed through the high input impedance differential amplifier circuit may be expressed in the following form:

$$f_t(T) = f_{SP}(T)f_a(T)$$
$$= f_{a0}f_{SP0}(1 + C_1T + C_2T^2 + C_3T^3 + C_4T^4)$$

where $C_1 = \alpha_{1SP} - \alpha_1 C_0$, $C_2 = \alpha_{2SP} - C_0(\alpha_{1SP}\alpha_1 + \alpha_2)$, $C_3 = -C_0(\alpha_{2SP}\alpha_1 + \alpha_{1SP}\alpha_2)$, and $C_4 = -C_0\alpha_{2SP}\alpha_2$.

If it is assumed that the third-order and fourth-order terms in T are negligible, the change in the total output $f_t(T)$ due to temperature variations can be substantially suppressed by requiring the first-order and second-order terms be zero, that is, $C_1 = C_2 = 0$. In other words, the resistance values $R_0$, $R_1$ and $R_2$ should be adjusted such that these conditions are satisfied.

As a particular example wherein use is made of an aluminum alloy for the load-sensitive element 1 and tantalum nitride for the strain gauges 4, 5, 6 and 7, $\alpha_1 = 5.40 \times 10^{-3}/°$ C., $\alpha_2 = 6.20 \times 10^{-6}/°$ C., $\alpha_{1SP} = 3.57 \times 10^{-4}/°$ C. and $\alpha_{2SP} = 5.36 \times 10^{-7}/°$ C. Then, the following set of values satisfies the aforementioned conditions: $R_0 = 66$ ohm, $R_1 = 910$ ohm and $R_2 = 2 \times 10^4$ ohm. Where, as here, $R_2$ is much greater than $R_0$ and $R_1$, $C_0$ is approximately equal to $R_0/(R_0+R_1)$ and the conditions $C_1 = C_2 = 0$ may be expressed as follows:

$\alpha_{1SP} = \alpha_1 R_0/(R_0+R_1)$, $\alpha_{2SP} = \alpha_{1SP}\alpha_1 + \alpha_2)R_0+R_1)$.

It is to be noted that $\alpha_1$ and $\alpha_2$ are uniquely determined from the experimentally determined temperature characteristic of the output from the bridge circuit 20. Their values depend on the temperature coefficient of the temperature-sensitive resistor element 25 to be used. Since the ratio among the values $R_0$, $R_1$ and $R_2$ is determined by the value of the amplification $f_{a0}$, the resistance values of the temperature-sensitive resistor element 25 and the precision resistor 26 can be determined from the above two equations. In this manner, the portion of the change in the output from the bridge circuit 20 corresponding to the positive second-order term in temperature variation is cancelled by the portion of the change in the temperature coefficient of the high input impedance differential amplifier circuit corresponding to the negative second-order term in temperature variation. As a result, the load sensor of the present invention can output a signal proportional only to the applied weight (load) independent of temperature variations in a fairly wide range of temperature around the reference temperature $T_0$.

It is further to be noted that strain gauges comprising tantalum nitride are more advantageous than the ordinary strain gauges made of a copper-nickel alloy because the specific resistivity of tantalum nitride is 6 times as great as those of copper-nickel alloys and the gauge ratio is 1.5 times as large. As a result, a sufficiently large detection output can be obtained even with a relatively low bridge voltage if use is made of tantalum nitride strain gauges. In other words, the load sensor of the present invention is particularly useful when used in connection with a device relying upon batteries as its power source.

As mentioned above, furthermore, the current which flows into the bridge circuit becomes smaller according to the present invention because the specific resistance of the strain gauges made of tantalum nitride is large. This makes it possible to reduce the generation of Joule heat by the strain gauges as well as by the resistors for zero-point adjustment. This, in turn, brings about the advantage of reducing the temperature change in the load-sensitive element which is exposed to the heat from them and, hence, of reducing the temperature drift in the detection output.

The particular embodiment of the present invention described above is not intended to limit the scope of the invention but is meant to be merely illustrative. In particular, although the present invention has been described above by way of an example combined with a differential amplifier circuit (as shown at 27) and applied to a high input impedance amplifier circuit, it goes without saying that the present invention can bring about advantageous effects equally when applied to a high input impedance inversion amplifier circuit, as shown in FIG. 5, with operational amplifiers 30 and 31. It should also be clear to persons skilled in the art that the temperature-sensitive resistor element 25 and the precision resistor 26 need not be connected in series as shown in FIG. 3 but may be connected in parallel (although not separately illustrated) to be effective.

It is also to be noted that the load-sensitive element need not be of an aluminum alloy but may be made of any material such as stainless steel, molybdenum steel and beryllium-copper alloys which can be used as materials for making springs. Similarly, the strain gauges need not necessarily be made of tantalum nitride but may be of any material such as a copper-nickel alloy and a nickel-chromium alloy that can be used to make precision resistors. The materials for the load-sensitive element and the strain gauges are generally selected such that the aforementioned conditions $C_1 = C_2 = 0$ are satisfied and that the rate of change in the span coefficient of the bridge output will be within a specified range such as 250–450PPM/° C. (if the temperature-sensitive resistor element and the precision resistor are made of nickel).

Any variation and modifications that may be apparent to a person skilled in the art are intended to be included within the scope of this invention.

What is claimed is:

1. A load sensor comprising
   a load-sensitive element comprising an aluminum alloy and having a surface,
   a bridge circuit with strain gauges formed with tantalum nitride on said surface of said load-sensitive element, said bridge circuit having signal output terminals,
   an amplifier circuit including a first operational amplifier and a second operational amplifier, said first and second operational amplifiers each having a non-inversion input terminal connected to one of said signal output terminals of said bridge circuit, the inversion input terminals of said first and second operational amplifiers being connected through a temperature-sensitive resistor element and a precision resistor, said temperature-sensitive resistor element having a positive second-order temperature coefficient, the second-order temperature dependence of signals outputted from said bridge circuit being cancelled by the second-order temperature dependence of said amplifier circuit.

2. The load sensor of claim 1 wherein said temperature-sensitive resistor element and said precision resistor are connected in series.

3. The load sensor of claim 1 wherein said temperature-sensitive resistor element and said precision resistor comprise nickel.

4. A load sensor comprising
a load-sensitive element having a surface,
a bridge circuit with strain gauges formed on said surface of said load-sensitive element, said bridge circuit having signal output terminals,
a first operational amplifier and a second operational amplifier, each having a non-inversion input terminal connected to one of said signal output terminals of said bridge circuit, the inversion input terminals of said first and second operational amplifiers being connected through a series connection of a temperature-sensitive resistor element with resistance $R_0$ and a precision resistor with resistance $R_1$, said temperature-sensitive resistor element having a positive second-order temperature coefficient, and said $R_0$ and $R_1$ being such that $\alpha_{1SP} = \alpha_1 R_0/(R_0+R_1)$ and $\alpha_{2SP} = (\alpha_{1SP}+\alpha_2)R_0/(R_0+R_1)$ where $\alpha_1$, $\alpha_2$, $\alpha_{1SP}$ and $\alpha_{2SP}$ are constants determined such that $(\alpha_1+\alpha_2 T)$ with T representing temperature measured from a reference temperature $T_0$ approximates the temperature coefficient near $T_0$ of the amplification of a differential amplifier circuit comprised of said first operational amplifier and said second operational amplifier, and that $(\alpha_{1SP}+\alpha_{2SP}T)$ approximates the temperature coefficient of the output from said bridge circuit near $T_0$.

5. The load sensor of claim 4 wherein said temperature-sensitive resistor element and said precision resistor comprise nickel.

6. The load sensor of claim 5 wherein the materials for said load-sensitive element and said strain gauges are selected such that the rate of change in the span coefficient of output from said bridge is within 250-450PPM/°C.

7. A load sensor comprising
a load-sensitive element having a surface,
a bridge circuit with strain gauges formed on said surface of said load-sensitive element, said bridge circuit having signal output terminals, and
a high input impedance amplifier circuit connected to said output terminals of said bridge circuit, said high input impedance amplifier circuit including a temperature-sensitive element such that the first-order temperature dependence and the second-order temperature dependence of signals outputted from said bridge circuit are respectively cancelled by the first-order temperature dependence and the second-order temperature dependence of said high input impedance amplifier circuit, said temperature dependence being all measured from a specified reference temperature level.

8. The load sensor of claim 4 wherein said load-sensitive element comprises stainless steel.

9. The load sensor of claim 4 wherein said strain gauges comprise a copper-nickel alloy.

10. The load sensor of claim 8 wherein said strain gauges comprise a copper-nickel alloy.

11. The load sensor of claim 4 wherein said load-sensitive element comprises molybdenum steel.

12. The load sensor of claim 4 wherein said load-sensitive element comprises beryllium-copper alloy.

13. The load sensor of claim 4 wherein said strain gauges comprise a nickel-chromium alloy.

14. The load sensor of claim 7 wherein said load-sensitive element comprises stainless steel.

15. The load sensor of claim 7 wherein said strain gauges comprise a copper-nickel alloy.

16. The load sensor of claim 14 wherein said strain gauges comprise a copper-nickel alloy.

17. The load sensor of claim 7 wherein said load-sensitive element comprises molybdenum steel.

18. The load sensor of claim 7 wherein said load-sensitive element comprises beryllium-copper alloy.

19. The load sensor of claim 7 wherein said strain gauges comprise a nickel-chromium alloy.

* * * * *